April 16, 1940.  A. W. BONHAM, JR., ET AL  2,197,248
TRACTOR
Filed June 23, 1937  5 Sheets-Sheet 1
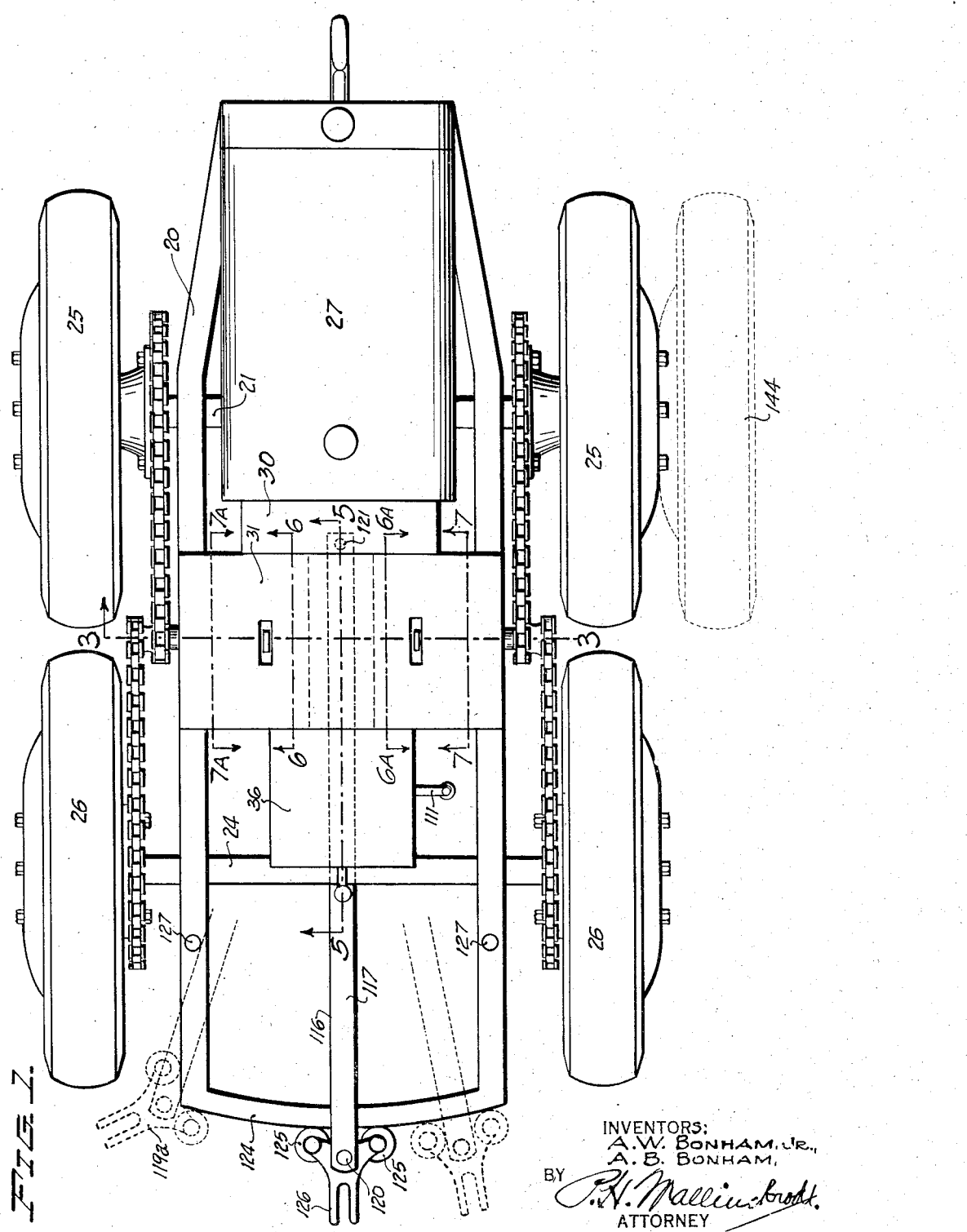
INVENTORS:
A. W. BONHAM, JR.,
A. B. BONHAM,
BY
ATTORNEY

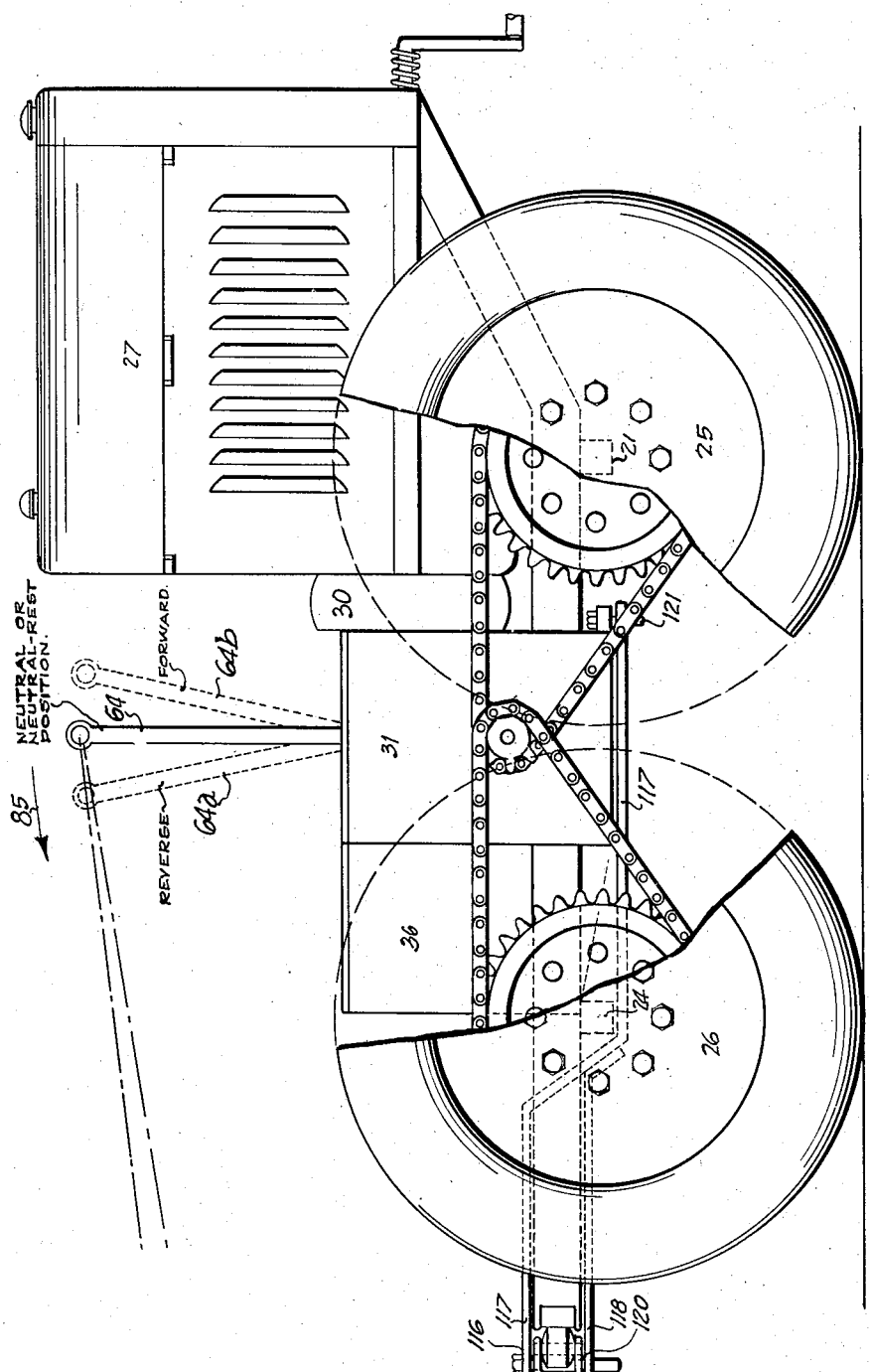

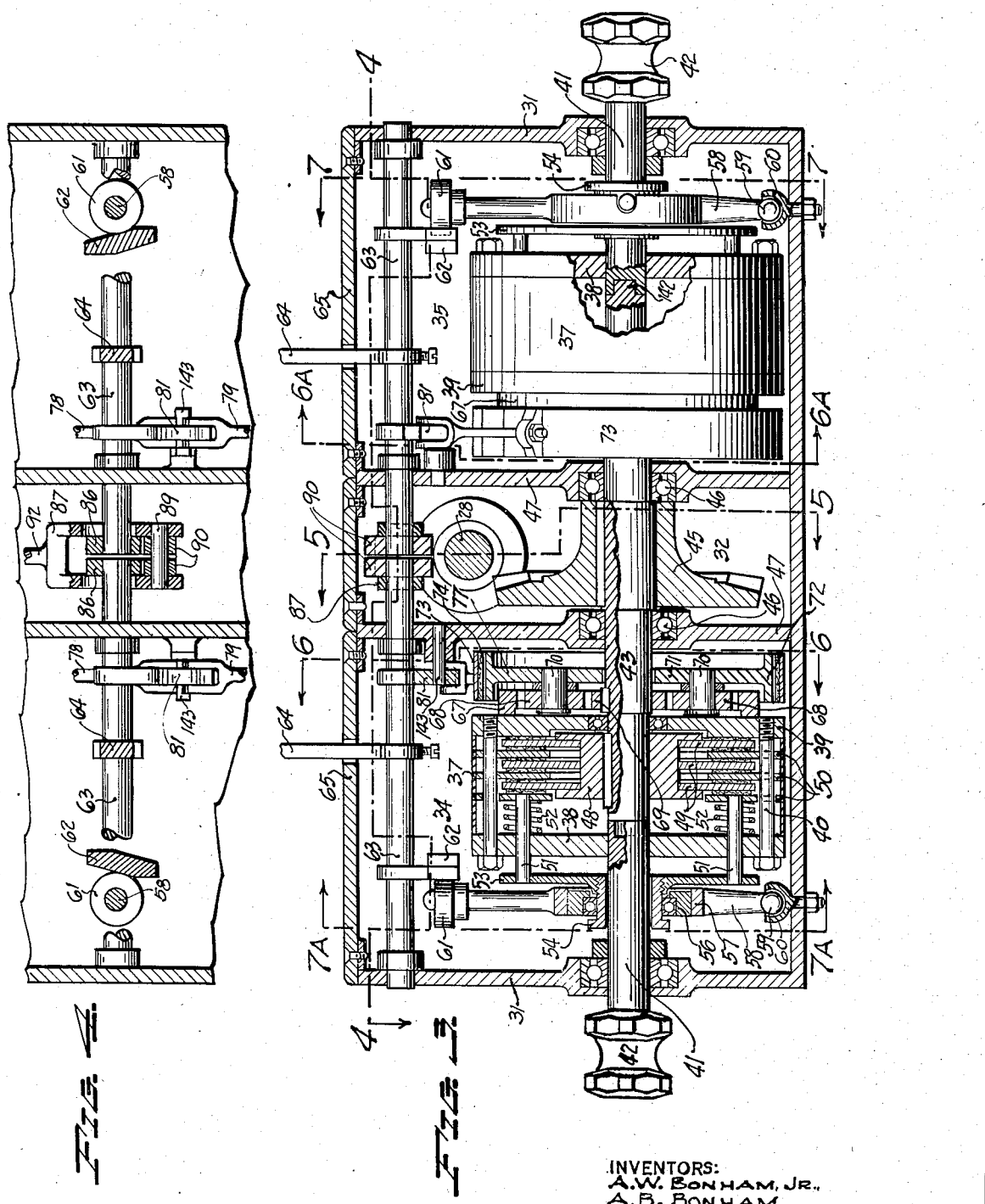

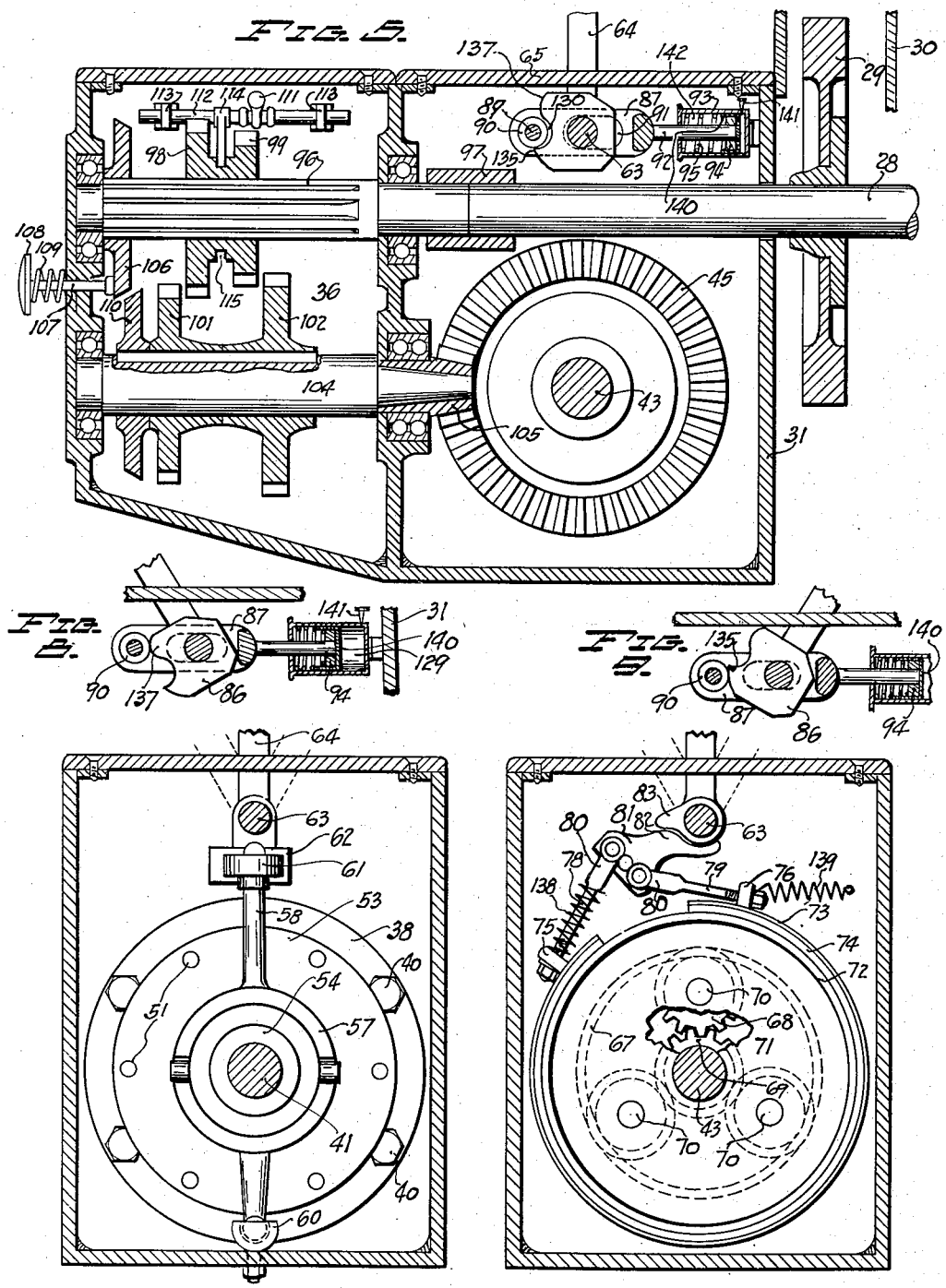

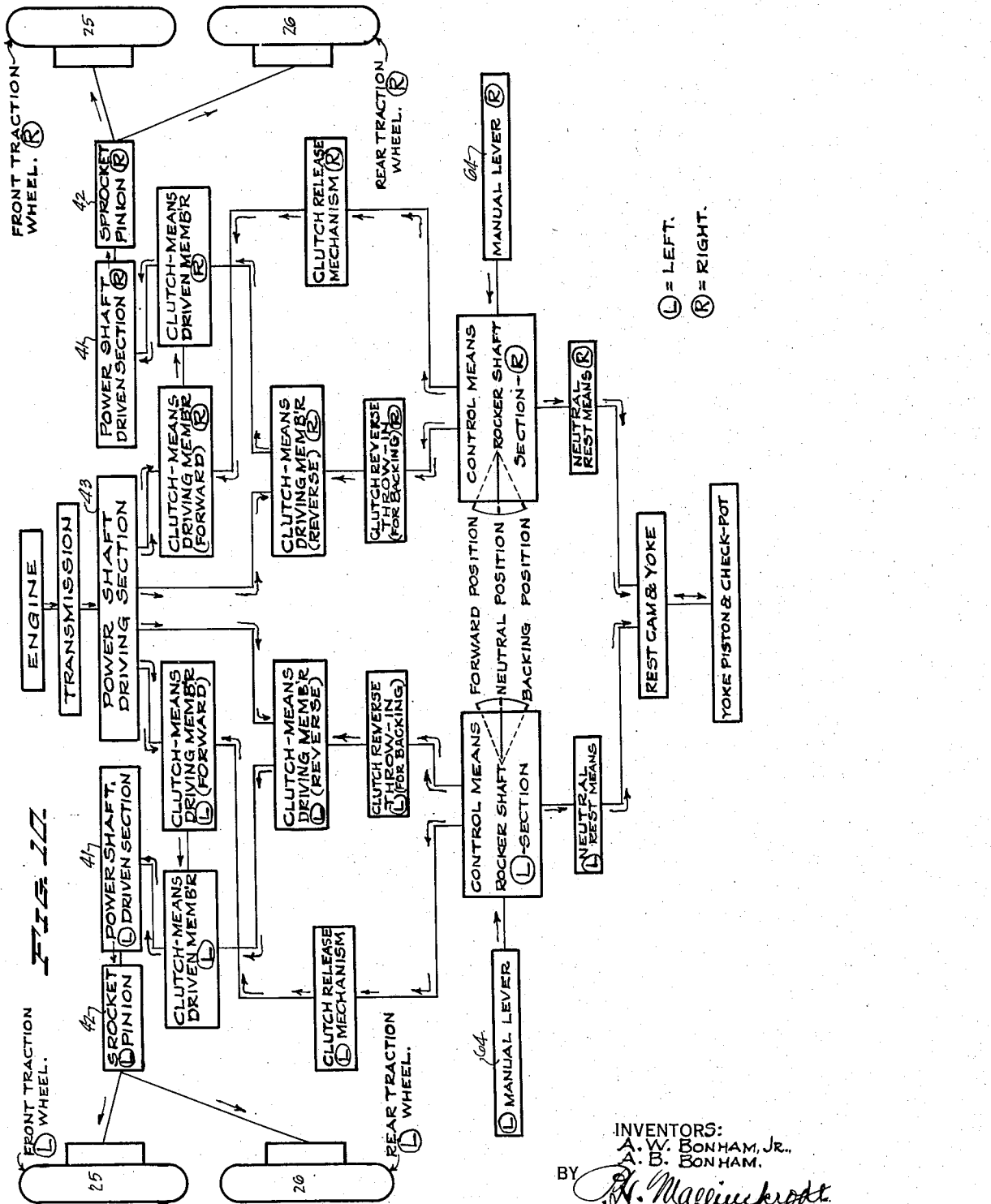

Patented Apr. 16, 1940

2,197,248

UNITED STATES PATENT OFFICE 2,197,248

TRACTOR

Albert W. Bonham, Jr., and Alvin B. Bonham, Clinton, Utah, assignors to Bonham Manufacturing Company, Montello, Nev., a corporation of Nevada Application June 26, 1937, Serial No. 150,470

26 Claims. (Cl. 180—17)

This invention relates to a tractor, and more particularly a general utility tractor, that is to say, one which may be used for substantially all purposes for which horses, mules or other draft animals have heretofore been used. For example, the machine may be used with equal facility for plowing, harrowing, cultivating, scraping and many other purposes on farms, and for widely diversified haulage of modern contractors' machinery, and the building of roads and in other engineering and industrial works.

The principal objects of the invention are:

First. To provide a tractor which may be completely controlled from a point remote from the tractor, by means of a pair of lines or reins in the hands of a driver although control of the machine may also be accomplished by an operator riding on the machine and handling the control device directly.

Second. To provide a machine which is positive and reliable in its action, but whose control mechanism is extremely sensitive and responsive.

Third. To be capable of making turns practically within its own length so as to economize space in turning at the ends of the furrows in plowing, or at the ends of the rows in cultivating farm crops, as well as in innumerable maneuvers in connection with industrial operations.

Fourth. To be capable of going straight ahead at a uniform speed, turning to either the right or the left, standing still for short periods or for periods of indefinite length, and backing either straight or to the right or left.

Fifth. To provide a tractor capable of being hitched to ordinary horse-drawn implements with only minor changes in implement hitch, such, for example, as replacing the ordinary long tongue with a short tongue.

Sixth. To be so compact and maneuverable as to facilitate operation in close quarters where ordinarily movement is difficult or even impossible.

Seventh. To be relatively simple in construction and operation, durable in use, and reasonable in cost.

Eighth. To be so conveniently handled by means of the reins or lines that the implement to which the tractor is attached can be manipulated even more effectively than if draft animals were used instead of the tractor, only one person being required for the entire performance.

Ninth. To provide clutch means, preferably in twin units, through which the power flow from a suitable source is routed direct from a forward driving member or a reverse driving member to a driven member, which is to say that at no time does the energy from the forward driving member have to flow through any element of the reverse driving member, or vice versa.

Tenth. To secure the maximum strength, compactness and maneuverability through the novel disposition of four traction wheels, two wheels, preferably in tandem, being disposed on each side of a body frame, all the wheels being rotatably journaled on rigid axles, and having their tire circumferences spaced apart from each other only so far as is necessary to provide adequate working clearance between the two.

In the drawings, which illustrate one embodiment of the invention,

Fig. 1 represents a plan;

Fig. 2 is a side elevation, a portion being broken away to show hidden parts;

Fig. 3 is a transverse vertical section taken on the line 3—3 in Fig. 1, drawn to an enlarged scale;

Fig. 4 is a fragmentary horizontal section taken on the line 4—4 in Fig. 3;

Fig. 5 is a longitudinal, vertical section taken on the line 5—5 in Fig. 3; the location of the section plane 5—5 is also indicated in Fig. 1, but is drawn to the same scale as Fig. 3; the drawbar being omitted;

Fig. 6 is a vertical section taken on the line 6—6 in Fig. 3; or on the line 6A—6A, looking in the direction of the arrows, but reflected from a mirror plane; the locations of these two sections are also indicated in Fig. 1;

Fig. 7 is a vertical section, taken on the line 7—7 in Fig. 3; or on the line 7A—7A looking in the direction of the arrows, but reflected from a mirror plane; the locations of these two sections are also indicated in Fig. 1;

Fig. 8 is a fragmentary portion of Fig. 5, showing an alternate position of certain parts;

Fig. 9 is a view similar to Fig. 8, but showing still another alternate position of the certain parts; and Fig. 10 is a flow sheet or diagram, indicating the flow of power from a suitable source, such as an automotive engine, through the various mechanical elements to the traction wheels, the control system to secure maximum maneuverability being also indicated.

The tractor of our invention may have any suitable number of traction wheels, usually four, rotatably disposed on rigidly mounted axles, so as form a rigid wheel base. Preferably, each traction wheel is driven separately. The two wheels on each side of the tractor are preferably arranged in tandem fashion, and the maneuverability of the tractor depends upon the motion given the traction wheels on one side relative to the motion of the traction wheels on the other side.

An important novel feature is a composite clutch means through which motion from a prime mover, such as an automotive engine, is transmitted to the traction wheels. The composite clutch means is in duplicate units, a right and a left, the two units being preferably spaced apart from each other transversely of the tractor, so as to admit transmission gearing between them. Each clutch-means unit is used to drive independently and selectively the pair of traction wheels on its side of the tractor.

Another important novel feature is the composite power shaft on which the clutch-means units are mounted. The composite power shaft comprises preferably three sections, a centrally disposed driving section and two laterally disposed tributary or driven sections, all in axial alignment with one another. Each composite clutch-means unit includes two driving members and one driven member. The two driving members of each clutch-means unit are mounted on the driving section of the power shaft, and the driven member of each clutch-means unit is mounted on its corresponding tributary driven section of the power shaft.

The two clutch-means units are controlled independently of each other through a two-part rock shaft. Each of the two rock shaft parts is manipulated by its own suitable means, in this instance, a lever rigidly mounted on the respective part. Each rock shaft part has three significant positions, a forward, a neutral, and a reverse or backing position. Novel features of the rock shaft control means will become apparent hereinafter. Suffice it to state at this point, that the control means is disposed in two or twin units loosely connected together so as to cause selectively the traction wheels on both sides of the tractor to be rotatable backward or forward, or so that the wheels on one side rotate in one direction while the wheels on the other side rotate simultaneously in the other direction, or vice versa. This, together with the compactness of disposition of traction wheels and ruggedness of the framework, gives the assurance of advantageous maneuverability.

Rigidity and sturdiness of frame structure is attained by means of a centrally disposed box or housing in which the twin clutch-means units are disposed, as well as by the disposition of the front frame portion and rear frame portion, which are rigidly connected to the centrally disposed housing. Preferably, the automotive engine is mounted on the front frame portion, and a change-gear transmission on the rear frame portion.

An advantageous feature of each clutch-means unit is that the flow of power from each driving member to the driven member is direct, that is to say, does at no time make use of any of the elements of the other driving member to transmit its power to the driven member.

Referring to the drawings, the numeral 20 indicates the chassis or framework, to which are rigidly secured the front axle 21 and rear axle 24. Both these axles hold a constant position at all times. Rotatably mounted on the axles are the front wheels 25 and the rear wheels 26, respectively. Naturally, the rigidity of the axles brings about the rigidity of the wheelbase.

At the front of the chassis 20 is mounted an engine (not shown) which is enclosed within a hood 27. The engine may be of any usual or suitable automotive design and be provided with a crankshaft 28 on which is mounted a flywheel 29 having preferably a housing 30. At the rear of the flywheel is a housing 31 which may be divided into a centrally disposed gear compartment 32 and two clutch compartments 34 and 35, opposite each other, and laterally adjacent the gear compartment on opposite sides thereof. At the rear of the clutch housing is a transmission housing 36.

In each of the clutch compartments 34 and 35 is a clutch 37. The clutch, in its general construction, may, and in this instance does, follow certain characteristics of disk clutches as heretofore known. However, a difference is that the releasing mechanism is located on the driven side instead of being on the driving side as is customary in previous types. In particular, the present clutch comprises the heads 38 and 39 connected rigidly together by bolts 40. The heads 38 are fast on the respective stub shafts 41 which, at their outer extremities, carry the rigidly mounted twin sprockets 42. The inner clutch heads 39 are rotatably mounted on a shaft 43 carrying the rigidly mounted bevel gear 45. The shaft 43 may be supported in ball bearings 46 which in turn are supported in the compartment walls 47.

Each of the clutches 37 has a hub portion 48 rigidly mounted on the shaft 43, and each hub portion in turn carries axially slidable, but angularly fixed, a plurality of circular driving plates 49. Disposed to be frictionally gripped by the driving plates 49 are the respective cooperating, driven plates 50. The axial movement of the plates 50 is quite small and takes place on the bolts 40. To accomplish this movement, a plurality of rods 51 are spaced angularly around the outermost plate 50, and the inner end of each rod is rigidly secured therein. The rods 51 are slidable through openings in the head 38. Compression springs 52 react between the head 38 and the outer plate 50, and exert their pressure normally to hold the plates 50 in frictional contact with the plates 49, whereby the clutch is operative to transmit motion from the shaft 43 to the head 38, and in turn to the stub shaft 41 and the twin sprocket 42.

In order to disengage the clutch plates 50 from the plates 49, the rods 51 at their outer ends are rigidly secured in a disk 53 having the hub 54. Rotatably mounted on the hub 54 is an antifriction thrust bearing 56, which is secured in the hub 57 of a shifting yoke 58, the latter having a ball 59 at its lower end, which is held in a stationary socket 60. The upper end of the shifting yoke 58 carries the rotatably mounted roller 61 which is in contact with an oscillating cam 62. The cam 62 is given an angular swinging motion because of its rigid mounting on a rock shaft 63. The rock shaft has rigidly secured on it an operating lever 64, which is angularly movable in a slot in the cover 65 of the clutch housing.

Rigidly secured on the head 39 is an internal gear 67 which is in mesh with the planetary gears 68, and these, in turn, mesh with the sun gear 69 which is rigidly mounted on the shaft 43. The planetary gears are rotatably mounted on pins 70, which are rigidly secured in the web 71 of a drum 77, having the circumferential brake rim 72. The brake rim, Fig. 6, is encircled by a flexible band 73 having preferably a friction or brake lining 74. Secured at or near the extremities of the gripping band 73, are the respective eyelets 75 and 76, and loosely secured in these eyelets are the respective bolts 78 and 79, whose forked ends 80 are pivotally connected to a toggle member 81 having the lever arm 82. Engaging the lever arm 82 is a cam 83, which is rigidly mounted on the rocker shaft 63. Obviously, when the operating lever 64 is pulled back, in the direction of the arrow 85, the lever arm 82 will be acted upon by the cam 83 to tighten the band 73, and thereby to grip the drum 77.

Each of the two clutch units in the respective compartments 34 and 35 has its own rocker shaft 63 independent of, but in axial alignment with, the other. The inner ends of the two rocker shafts 63 are in close proximity to each other, as shown in Fig. 3, and the extremity of each of the rocker shafts has rigidly mounted thereon a cam 86.

Extending around both cams 86, and straddling the two rocker shafts 63, is a yoke 87. This yoke carries a pin 89 on which are journaled two rollers 90, each roller being in alignment with a respective cam 86. The normal position of the yoke relative to the cams 86 is indicated in Fig. 5, but the yoke is movable back and forth, as and for a purpose presently to be described. The yoke is slotted at 91 in order to accommodate the shafts 63. The yoke has a forward stroke and a backward stroke, and disposed to control the backward stroke, is a stem 92, which extends into a check-pot 93. The stem 92 carries a piston 94, which is acted upon by a compression spring 95 operative to keep it in the normal position indicated in Fig. 4. The check-pot may advantageously be rigidly mounted on a wall of the casing 31.

Motion from the engine crankshaft 28 is imparted to the shaft 43 in suitably varying ratios through the transmission in the compartment 36. The transmission may consist of a splined shaft 96 which may be connected to the crankshaft by means of a sleeve coupling 97. The shaft 96 carries axially movable gears 98 and 99, which are adapted to mesh respectively with the gears 101 and 102, the latter two gears being rigidly mounted on a shaft 104. Shaft 104 has rigidly mounted thereon a beveled pinion 105, which meshes with the bevel gear 45. As shown in Fig. 5, the transmission gears are in the neutral position where no motion is transmitted from the shaft 96 to the shaft 104.

For the purpose of preventing clashing between the gears of the transmission when shifting, a slidable disk 106 engages the splines on shaft 96 and has a limited movement axially thereon. This disk has a conical face and may be moved in the direction of the arrow by means of the stem 107, which latter is slidably disposed in a wall of the housing, and has a button head 108 adapted to be pressed by the operator against the tension of the compression spring 109, this spring being normally effective to keep the stem in the normal position indicated in Fig. 5.

In operative conjunction with the disk 106, is a mating disk 110, which latter is fast on the shaft 104, and has a conical face adapted to run with the conical face of the disk 106. When it is desired to shift gears, assuming the engine to be running, and the transmission to be neutral, the operator first pushes the button in the direction of the arrow, thereby bringing the disk 186 into engagement with the disk 110 and causing the shaft 104 to rotate before shifting of the gears is attempted. The shaft 104 rotates preferably at a mean of the different transmission ratios, thereby facilitating the engagement of the desired gears substantially without clashing.

Shifting of the change gears 98 and 99, which are integral with each other, is accomplished by means of a lever 111 operative to move a bar 112, slidably disposed in bearings 113, back or forth. Fixed on the bar 112 is a depending finger 114 whose lower extremity extends into a circumferential groove 115 formed in the hub common to the two gears. At the discretion of the operator, the gear 98 may be brought selectively into mesh with the gear 101, or the gear 99 be selectively brought into mesh with the gear 102. While only two change gears are shown in the present instance, more can be provided, three or four being frequently used.

A feature which adds greatly to the utility and maneuverability of the tractor relates to the drawbar 116, Figs. 1 and 2. The drawbar may be constructed in various ways. In the present instance it comprises a metal bar 117 in conjunction with another bar 118, the rear extremities of these bars forming between them a jaw for receiving a swiveled clevis 119 which is pivoted at 120. The drawbar is disposed to swing around a pivot 121, and a frame member 124 conforms to an arc described from the pivot 121 as a center. The clevis is provided with guide rollers 125 spaced apart from each other and adapted to track on the member 124 as a guide for holding the clevis in alignment with the drawbar proper, excepting at such times as the tractor is making short-radius turns.

The clevis is forked at 126 and has the holes 127 located at varying levels, so as to receive connections from a tongue or other pulling member of an implement, in the usual manner.

The advantage of this drawbar with its articulated clevis, is that so long as the rollers 125 remain on the track 124, the tractor pulls in a straight line from the pivot 121, on through the clevis, but in making relatively short turns, the clevis 119, after leaving one end of the track, as indicated by the dotted lines at 119a, aligns itself with, and accommodates itself to, the implement to which it is attached, without unduly stressing any mechanical part, but at the same time permits a very short turn to be made. Stops 127, which may be conveniently located in the frame, limit the swing of the drawbar to either side and prevent the tractor from bumping into an implement being pulled by it.

*Operation*

The operation of the tractor may be conveniently followed by reference to Fig. 10. This figure constitutes a flow sheet or diagram which clearly visualizes the flow of power from the prime mover or motive means to the traction wheels, and the manner of controlling the power. The diagram shows broadly the relations of the operative parts of the tractor, one to another.

Explanation of principal terms appearing in Fig. 10:

"Power-shaft driving section" refers to shaft 43.

"Power-shaft driven section L. and R." refers to the left and right stub shafts 41.

"Clutch-means forward driving member" may include the hub 48, driving plates 49, and springs 52; right or left.

"Clutch-means reverse driving member" may include the sun gear 69, planetary gears 68, and band 73; right or left.

"Clutch-means driven member" may include the heads 38 and 39, driven plates 50, and internal gears 67; right or left.

"Clutch release mechanism" may include the shifting disk 53, shifting yoke 58, and oscillating cam 62; right or left.

"Clutch reverse throw-in" may include cam 83, toggle 81, and lever arm 82; right or left.

"Neutral rest means" may include the cam or cams 86, the yoke 87, and the check-pot 93.

Before starting the engine, the manual control or operating levers 64 should both stand in the neutral rest position. This allows the engine shaft to rotate without driving the tractor. The neutral rest position is attained by holding both control levers simultaneously in the neutral position for a certain minimum period of time, determined in a way to be presently explained. The neutral rest position is made use of in starting, or when it is desired to let the tractor stand stationary for any prolonged period. The control levers are released from the neutral rest position by pulling back slightly on one or the other or both levers, and then allowing both to move into the forward position. Supposing the shaft 43 to be rotating, then, with both levers in the forward position, the tractor moves straight ahead. If both levers are pulled simultaneously into the reverse position, the tractor moves straight back. If the left-hand lever is in forward, and the right-hand lever is in neutral, the tractor turns forward to the right. If now, the right-hand lever is pulled back into reverse, the tractor turns to the right double-quick. If the right-hand lever is in forward, and the left-hand lever is in neutral, the tractor turns forward to the left. If now, the left-hand lever is pulled clear back into reverse, the tractor turns to the left double-quick. In either of these double-quick maneuvers, the tractor may easily make a complete turn within the limits of its own wheelbase. In either case, the double-quick turn results because of tightening the proper brake band 73, whereby the corresponding drum 77 is held stationary, thus causing the motion from the sun gear 69 to reverse the driven member 38 with its stub shaft 41.

In order to back to the right, the right-hand lever is placed in neutral and the left-hand lever in reverse. Now, letting the right-hand lever move forward, causes this backing turn to be made double-quick. In backing to the left, the procedure just described, is reversed.

The detailed functioning of the brake band 73 is indicated in Fig. 6. As shown, the lining 74 is supposed to be relaxed on the drum rim 72, under the influence of a compression spring 138 strung on the bolt 78, and a tension spring 139, both springs tending to open out the band. Pulling the lever 64 back, into the reversing position 64a, tightens the band and brings the lining into gripping contact with the drum rim. Allowing the lever to be urged into the forward position 64b, under the tension of springs 52, merely causes the hub of the cam 83 to idle in the concentric arcuate portion of the lever arm 82, and leaves the band and its lining relaxed.

A prominent advantage of the novel arrangement of the clutch means is that the flow of power from the power-shaft driving section to the power-shaft driven section is always direct through either one or the other of the driving members, and never indirect through both simultaneously. This may be clearly seen in the flow sheet, Fig. 10. For example, in Fig. 3 it can be seen at a glance, that the flow of power from the shaft 43 through the clutch-means forward driving member, either L or R, as the case may be, diagrammed in Fig. 10, and composed of a driving hub 48 and plates 49, goes directly and only through these, to the respective clutch-means driven member, diagrammed in Fig. 10, which clutch-means driven member includes heads 38 and 39, driven plates 50, and internal gear 67. Similarly, in Fig. 3 it can be seen that the flow of power from the shaft 43 through the clutch-means reverse driving member, either L or R, as the case may be, diagrammed in Fig. 10, and composed of a sun gear 69, planetary gears 68, and an internal gear 67, goes directly and only through these, to the same respective clutch-means driven member aforementioned. Note particularly, that at such times as the driving plates 49 are locked in engagement with the driven plates 50, the gripping band 73 is loose on the rim of drum 77, so that no power at all can flow through planetary gears 68. Again, note that at such times as the drum 77 is locked in the grip of the band 73, no power at all can flow through the driven plates 50, since these are detached from the driving plates 49.

For the sake of generalization, either the "clutch-means forward driving member" or the "clutch-means reverse driving member" may be designated as: "a driving member rotatable in a given direction," in which case the other one of the two clutch-means driving members can be referred to as: "a second driving member rotatable in a direction opposite to the given direction."

In comparing the invention with some prior clutches and planetary gear devices, it is to be kept in mind that the hub 48 of the clutch-means forward driving member, and the sun gear 69 of the clutch-means reverse driving member, are wholly independent of each other in operative action, and that their positions along the axis of the shaft 43, which naturally coincides with their own rotative axes, are fixed.

As heretofore constructed, certain clutch mechanisms transmit power from two drivers, one forward and one reverse, to a driven member, but in these mechanisms the flow of power through the forward driver is not direct, but includes in its line of flow the elements of the reverse driver. This may be amplified by stating that in the heretofore known clutch mechanisms, the reverse driver generally includes a planetary transmission mechanism, which is completely locked in the event that the forward driver is in use. The locked planetary transmission elements are positioned between the forward driver and the driven member, whereby there is a leverage exerted by the planetary gears, which the mechanical disadvantage, imposes twice the stress upon certain of the transmission members, including the driving and driven plates of the friction-disk clutch. Therefore, in transmitting an equal power, the clutch disks as used heretofore must be at least twice as massive as in the present novel construction, and naturally increase the wear and tear on the friction disks proportionally.

The neutral-rest means functions as follows. In the neutral-rest position, both cams 86 occupy the position shown in Fig. 5, and are held yieldingly in that position under the urge of the springs 52. The spring urge forces the point 135 sharply against the bottom of the respective roller 90 which occupies a recess 130 in the respective cam 86, as indicated in Fig. 5. In breaking the neutral-rest position of the cam, a slight pull back on either one or both of the levers causes the corresponding one, or both, of the cam portions 137 to push the yoke 87 to the left, far enough for the point 135 of either one or both cams to slip past the corresponding roller or rollers as the case may be, thereby in either case breaking the locking effect upon both rollers. The piston 94 moves to the left with the yoke and compresses the spring 95, at the same time causing the piston to draw air on its receding side past a cup leather 140, which acts as a check valve. At the proper moment the manual hold on the levers is suddenly relaxed, whereby both levers and their respective cams, under the urge of springs 52, are moved to their forward position, which is indicated in Fig. 9.

After relaxing the manual hold on the levers, the rollers are prevented from closely following the forward travel of the cam, because of the retarding action resulting from compression of air in the space 129, thus preventing the rollers from dropping quickly back into the recesses 130. The egress of the air from the space 129 is controlled by an adjustable needle valve 141 of ordinary construction, and this can be regulated to retard movement of the yoke 87 and rollers 90 the desired length of time. The rollers finally come to rest against the cam, as shown in Fig. 9.

The neutral-rest or locked position of the cams and rollers is attained by moving both levers 64 simultaneously into the neutral position, and holding them both simultaneously in the neutral position for a short though appreciable period of time, within which time period the rollers drop into the recesses 130 and lock with the cams, until again released. The air in the space 142 to the left of the piston, Fig. 5, is in free communication with the atmosphere, and so offers no resistance either way to the movement of the piston.

Having fully described our invention, what we claim is:

1. A tractor having traction members, including in combination, two clutch-means units in axial alignment with, and spaced apart from, each other, each of the clutch-means units comprising a forward driving member, a reverse driving member, and a driven member adapted to be selectively connected to either of the two driving members; gear means disposed to impart motion simultaneously to both the said clutch-means units; selective means operable to at least connect the forward driving member of one clutch-means unit with the driven member of that unit and simultaneously to connect the reverse driving member of the other clutch-means unit with the driven member of this other unit, or vice versa; a transmission mechanism disposed to be selectively connected to the said gear means, and located to one side thereof, motive means connected to the said transmission mechanism, and means for transmitting motion from each of the said clutch-means units to its corresponding traction member.

2. A tractor having traction members, in accordance with claim 1, but including a shaft on which the driving members of said clutch-means units and a member of the gear means are rigidly mounted, and stub shafts at both ends of the first-mentioned shaft, the driven members of said clutch-means units being rigidly mounted on the said stub shafts; and wherein the said means for transmitting motion extend from the stub shafts to the said traction members.

3. A tractor having traction members, in accordance with claim 1, wherein the said clutch-means units are selectively operative either independently or together, as the case may require, by means of two individual control mechanisms, each individual control mechanism including a rock shaft having a forward, neutral and a backing position, a cam effective to cause the forward driving member of the respective clutch-means units to engage the driven member of the clutch-means units in the forward position of the rock shaft, and a second cam effective to cause the reverse driving member of the clutch-means units to energize the driven member in the backing position of the rock shaft.

4. A tractor, including in combination, motive means, traction wheels operatively connected with the motive means; clutch means comprising two clutch units each having a forward driver, a reverse driver and a driven member adapted to be connected to either the forward driver or to the reverse driver independently of the other, the two clutch units being operative selectively to vary, or to cut off, the transmission of motion from the motive means to their corresponding traction wheels, and a control cam mechanism operative upon the said clutch means, the said control cam mechanism being actuated by independent manual motion thereto in only one direction to selectively cause the tractor to be driven forward, to stand still indefinitely, or to be driven backward.

5. A tractor, including in combination, a prime mover, traction wheels operatively connected therewith, clutch mechanism having a forward driving member and a reverse driving member operative individually and independently to transmit rotative motion from the prime mover to the traction wheels, a rock shaft having a forward position, a neutral position, and a reverse position; a mechanism selective to cause the engagement of the forward driving member of the clutch in the forward swing of the rock shaft, and a throw-in mechanism selective to engage the reverse driving member of the clutch in the reverse swing of the rock shaft.

6. A tractor, in accordance with claim 5, in which the rock shaft mechanism includes an oscillating cam having a neutral-rest position, a yoke having means effective to lock the cam in the neutral-rest position, cam means effective to displace the yoke from the cam-locking position, and check means effective to properly retard the movement of the yoke from the displaced position back through the locking position.

7. Clutch means, including in combination, a drive shaft, a stub shaft at each end of the drive shaft and in axial alignment therewith, a clutch driver member rigidly mounted on the drive shaft contiguous to each of the said stub shafts, a driven clutch member rigidly mounted on each of the stub shafts, gripping means selectively operated to connect or disconnect the clutch drivers to the respective driven clutch members, an internal gear rigidly connected to each driven clutch member, planetary gears in mesh with each internal gear, sun gears in mesh with the planetary gears and rigidly mounted on the said drive shaft, drums on which the planetary gears are rotatably mounted, brake bands encircling the drums, and means operable selectively and independently to cause the respective gripping means to connect either clutch driver with its driven clutch member or to cause either of said bands to grip or release its drum, the related gripping means and brake bands being operative alternatively whereby to provide two flow channels for motive power, wholly reversed and independent, from said drive shaft to each of said stub shafts.

8. Driving-control means, including in combination, two mutually interconnected control units, each having lever means movable back and forth from a forward-driving to a reversing position and vice versa, cam means effective to normally hold the lever means in the forward-driving position or to urge the lever means toward the forward-driving position from any other position thereof, the said two lever means being selectively movable, either independently or together to a neutral-rest position substantially intermediate the forward-driving and reversing positions thereof, a releasable locking yoke disposed to hold the two lever means simultaneously in neutral-rest position for optional time periods, and dash-pot timing means connected to the locking yoke.

9. In a self-propelled vehicle having a driving shaft and a driven shaft, clutch mechanism for transmitting motion from the driving shaft to the driven shaft, said clutch mechanism comprising clutch means rigidly mounted on said driving shaft and clutch means rigidly mounted on said driven shaft, the two said clutch means being adapted for clutching engagement in transmitting rotative motion directly and unidirectionally from said driving shaft to said driven shaft, and said clutch mechanism further comprising gear means rigidly mounted on said driving shaft, gear means rigidly mounted on said driven shaft, intermediate gear means in mesh with both said gear means and mounted for rotation per se and for free revolution about said driving shaft, and means for holding said last named gear means against free revolution about said driving shaft.

10. In a tractor including a prime mover, traction means, and clutch mechanism interposed between said prime mover and said traction means including selectively operable forward and reverse driving members for driving said traction means from said prime mover; control means for said clutch mechanism comprising a movable member having a forward drive position, a neutral-rest position and a reverse drive position, means for releasably locking said member in the neutral-rest position, means to release said locking means upon motion of said member from the neutral-rest position in one direction, and means for restraining said locking means from locking position to permit free return movement of said movable member through the neutral-rest position to the drive position in the opposite direction.

11. In a tractor including a prime mover, traction means, and clutch mechanism interposed between said prime mover and said traction means including selectively operable forward and reverse driving members for driving said traction means from said prime mover; control means for said clutch mechanism comprising two independently operable movable members each having a forward drive, a reverse drive and a neutral-rest position, means common to both movable members for releasably locking them in the neutral-rest position, and means to render said locking means inoperative when either of said members is in other than the neutral-rest position.

12. In a tractor including a prime mover, traction means, and clutch mechanism interposed between said prime mover and said traction means including selectively operable forward and reverse driving members for driving said traction means from said prime mover; control means for said clutch mechanism comprising two independently operable movable members each having a forward drive, a reverse drive and a neutral-rest position, means normally urging said movable members toward the forward drive position, means for moving said members in the opposite direction, means common to both movable members for releasably locking them in the neutral-rest position, and means to render said locking means inoperative when either of said members is in other than the neutral-rest position.

13. In a tractor including a prime mover, traction means, and clutch mechanism interposed between said prime mover and said traction means including selectively operable forward and reverse driving members for driving said traction means from said prime mover; control means for said clutch mechanism comprising two independently operable movable members each having a forward drive, a reverse drive and a neutral-rest position, and means common to both movable members operative to lock them in the neutral-rest position only when both of said movable members are in said neutral-rest position.

14. In a tractor including a prime mover, traction wheels, and clutch mechanism interposed between said prime mover and said traction wheels including selectively operable forward and reverse driving members for driving said traction wheels from said prime mover; control means for said clutch mechanism comprising a pair of independently movable rock shaft members each having a forward drive, a reverse drive and a neutral-rest position, each of said rock shaft members having a cam part, and means common to each of said rock shaft members for releasably locking said rock shaft members in the neutral-rest position, and said cam parts including surfaces operative to render said locking means inoperative when either of said rock shaft members is in other than the neutral-rest position.

15. In a tractor including a prime mover, traction wheels, and clutch mechanism interposed between said prime mover and said traction wheels including selectively operable forward and reverse driving members for driving said traction wheels from said prime mover; control means for said clutch mechanism comprising a pair of independently movable rock shaft members each having a forward drive, a reverse drive and a neutral-rest position, means normally urging said rock shaft members toward the forward drive position, means for moving said rock shaft members in the opposite direction, means common to each of said rock shaft members for releasably locking said rock shaft members in the neutral-rest position, and means operative to render said locking means inoperative when either of said rock shaft members is in other than the neutral-rest position.

16. In a tractor including a prime mover, traction wheels, and clutch mechanism interposed between said prime mover and said traction wheels including selectively operable forward and reverse driving members for driving said traction wheels from said prime mover; control means for said clutch mechanism comprising a pair of independently movable rock shaft members each having a forward drive, a reverse drive and a neutral-rest position, each of said rock shaft members having a cam part, and means common to each of said rock shaft members including a latch part yieldingly engaging said cam parts and operative to releasably lock said rock shaft members in the neutral-rest position, and said cam parts including portions to retain said latch part in inoperative position when either of said rock shaft members is in other than neutral-rest position.

17. In a tractor including a prime mover, traction means, and clutch mechanism interposed between said prime mover and said traction means including selectively operable forward and reverse driving members for driving said traction means from said prime mover; control means for said clutch mechanism comprising a movable member having a forward drive position, a reverse drive position and a neutral-rest position intermediate said drive positions; means for releasably locking said movable member in said neutral-rest position; means to release said locking means upon motion of said movable member from neutral-rest position in one direction, means for restraining said locking means from locking position, and means for moving said movable member in the other direction through the neutral-rest position to the drive position in the other direction while said locking means is restrained from locking position.

18. In a tractor including a prime mover, traction means, and clutch mechanism interposed between said prime mover and said traction means including selectively operable forward and reverse driving members for driving said traction means from said prime mover; control means for said clutch mechanism comprising a rock shaft having a forward drive position, a reverse drive position and a neutral-rest position intermediate said drive positions; a cam member fixed on said rock shaft, a movable yoke having means engaging said cam to lock the cam and associated rock shaft in neutral-rest position, yielding means normally urging said yoke to cam locking position, means for displacing said yoke from cam locking position upon motion of said cam and rock shaft from the neutral-rest position in one direction, and means to retard the return of said yoke to cam locking position to permit free return motion of said rock shaft through the neutral-rest position to the drive position in the opposite direction.

19. Driving control means for a tractor of the character described, including in combination two control units, each having lever means movable back and forth between a forward-drive and a reverse-drive position; means effective normally to hold the lever means in one drive position and to urge the lever means toward said drive position from any other position thereof, the lever means being movable selectively either independently or together to a neutral-rest position intermediate the forward and reverse drive positions, and means common to both lever means operative to lock them in the neutral-rest position only when both of said lever means are in said neutral-rest position.

20. Driving control means for a tractor of the character described, including in combination two control units, each having lever means movable back and forth between a forward-drive and a reverse-drive position; means effective normally to hold the lever means in one drive position or to urge the lever means toward said position from any other position thereof, the lever means being movable selectively either independently or together to a neutral-rest position intermediate the forward and reverse drive positions; means for releasably holding said lever means in the neutral-rest position for optional time periods, and means to release said holding means upon motion of one of said lever means from the neutral-rest position in the direction opposite to that in which the lever means are normally urged.

21. In a tractor including a frame, traction means at opposite sides thereof and a motor carried by said frame to drive said traction means; means for transmitting motion from said motor to said traction means to drive the same selectively and independently in either direction; said motion transmitting means including a pair of clutch units, a drive shaft common to said units, a driving connection from said motor to said drive shaft, driven means in driving connection with the respective traction means, each of said clutch units including a forward driving clutch member rigidly mounted on said drive shaft, a driven clutch member carried by the related driven means to provide a direct drive connection from said drive shaft to said driven means, reverse drive means including planetary gearing between said drive shaft and said driven means, said direct drive connection through the forward driving and driven clutch members being wholly independent of elements of the reverse drive means; and means for controlling each clutch unit independently and selectively to cause engagement of either the forward or reverse driving members of each clutch unit with the driven member thereof independently of the other clutch unit.

22. In a tractor including a frame, traction means at opposite sides thereof and a motor carried by said frame to drive said traction means; means for transmitting motion from said motor to said traction means to drive the same selectively and independently in either direction; said motion transmitting means including a pair of clutch units, a drive shaft common to said units, a driving connection from said motor to said drive shaft, driven means in driving connection with the respective traction means, each of said clutch units including a forward driving clutch member rigidly mounted on said drive shaft, a driven clutch member carried by the related driven means to provide a direct drive connection from said drive shaft to said driven means, reverse drive means including planetary gearing between said drive shaft and said driven means, said direct drive connection through the forward driving and driven clutch members being wholly independent of elements of the reverse drive means; and means for controlling each clutch unit independently and selectively to cause engagement of either the forward or reverse driving members of each clutch unit with the driven member thereof independently of the other clutch unit, said control means including a movable member associated with each clutch unit and movable back and forth between a forward-drive and a reverse-drive position, means effective normally to hold the movable members in one drive position and to urge the same toward said position from any other position thereof, the movable members being movable selectively either independently or together to a neutral-rest position intermediate the forward and reverse drive position, means common to both movable members for releasably holding the same in the neutral-rest position, and means for rendering said holding means inoperative when either of said members is in other than the neutral-rest position.

23. In a tractor including a frame, traction means at opposite sides thereof and a motor carried by said frame to drive said traction means; means for transmitting motion from said motor to said traction means to drive the same selectively and independently in either direction; said motion transmitting means including a pair of clutch units, a drive shaft common to said units, a driving connection from said motor to said drive shaft, driven means in driving connection with the respective traction means, each of said clutch units including a forward driving clutch member rigidly mounted on said drive shaft, a driven clutch member carried by the related driven means to provide a direct drive connection from said drive shaft to said driven means, reverse drive means including planetary gearing between said drive shaft and said driven means, said direct drive connection through the forward driving and driven clutch members being wholly independent of elements of the reverse drive means; and means for controlling each clutch unit independently and selectively to cause engagement of either the forward or reverse driving members of each clutch unit with the driven member thereof independently of the other clutch unit, said control means including a rock shaft associated with each unit, each rock shaft having a forward drive position, a neutral-rest position and a reverse drive position, locking means common to both rock shafts for releasably holding the same in the neutral-rest position, and means to release said locking means upon motion of either rock shaft from the neutral-rest position.

24. In a tractor including a frame, traction means at opposite sides thereof and a motor carried by said frame to drive said traction means; means for transmitting motion from said motor to said traction means to drive the same selectively and independently in either direction; said motion transmitting means including a pair of clutch units, a drive shaft common to said units, a driving connection from said motor to said drive shaft, driven means in driving connection with the respective traction means, each of said clutch units including a forward driving clutch member rigidly mounted on said drive shaft, a driven clutch member carried by the related driven means to provide a direct drive connection from said drive shaft to said driven means, reverse drive means including planetary gearing between said drive shaft and said driven means, said direct drive connection through the forward driving and driven clutch members being wholly independent of elements of the reverse drive means; and means for controlling each clutch unit independently and selectively to cause engagement of either the forward or reverse driving members of each clutch unit with the driven member thereof independently of the other clutch unit, said control means including lever means associated with each clutch unit and movable back and forth between a forward-drive and a reverse-drive position, means effective normally to hold the lever means in one drive position and to urge the lever means toward said position from any other position thereof, the lever means being movable selectively either independently or together to a neutral-rest position intermediate the forward and reverse drive positions, and means common to both lever means for releasably holding them in the neutral-rest position, said means being operative to lock said levers only when both are in said neutral-rest position.

25. In a tractor including a frame, traction means at opposite sides thereof, and a motor carried by said frame to drive said traction means; means for transmitting motion from said motor to said traction means to drive the same selectively and independently in either direction; said motion transmitting means including a pair of clutch units, a drive shaft common to said units, a driving connection from said motor to said drive shaft, driven means in driving connection with the respective traction means, each of said clutch units including a forward driving clutch member mounted on said drive shaft, a driven clutch member carried by the related driven means to provide a direct drive connection through said driving and driven clutch members from said drive shaft to said driven means, and reverse driving means between said drive shaft and said driven means, said direct drive connection through said forward driving and driven clutch members being wholly independent of elements of said reverse driving means; and means for controlling each of said clutch units independently and selectively to drive said driven means from said drive shaft through either the forward or reverse driving means thereof.

26. In a tractor including a frame, traction means at opposite sides thereof, and a motor carried by said frame to drive said traction means; means for transmitting motion from said motor to said traction means to drive the same selectively and independently in either direction; said motion transmitting means including a pair of clutch units, a drive shaft common to said units, a driving connection from said motor to said drive shaft, driven means in driving connection with the respective traction means, each of said clutch units including a forward driving clutch member mounted on said drive shaft, a driven clutch member carried by the related driven means to provide a direct drive connection through said driving and driven clutch members from said drive shaft to said driven means, and reverse driving means between said drive shaft and said driven means, said direct drive connection through said forward driving and driven clutch members being wholly independent of elements of said reverse driving means; and means for controlling each of said clutch units independently and selectively to drive said driven means from said drive shaft through either the forward or reverse driving means thereof, said control means comprising two independently operable movable control members each having a forward-drive, a reverse-drive and a neutral-rest position, means common to both movable members for releasably locking them in the neutral-rest position, and means to render said locking means inoperative when either of said members is in other than the neutral-rest position.

ALBERT W. BONHAM, Jr.
ALVIN B. BONHAM.